Nov. 6, 1934.                P. KÖHLER                1,979,482
                ABSORPTION REFRIGERATING APPARATUS
                      Filed March 12, 1931
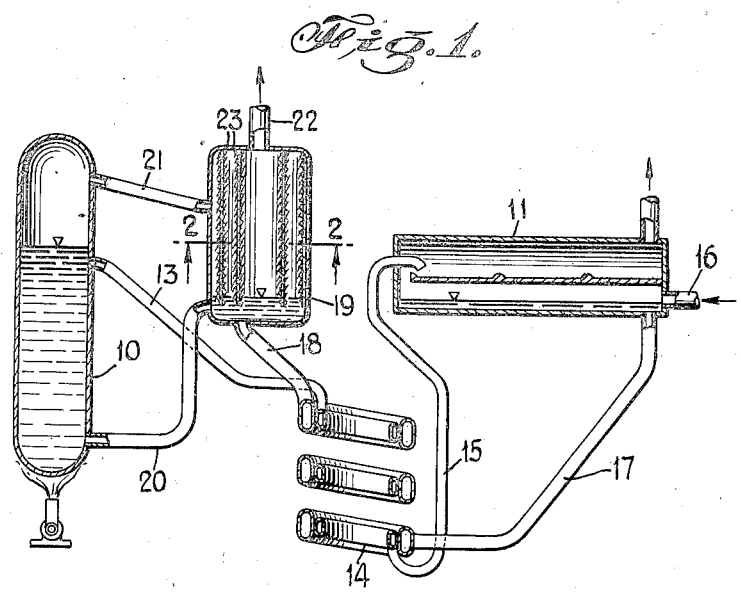
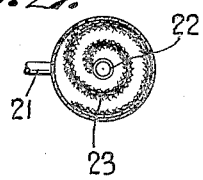
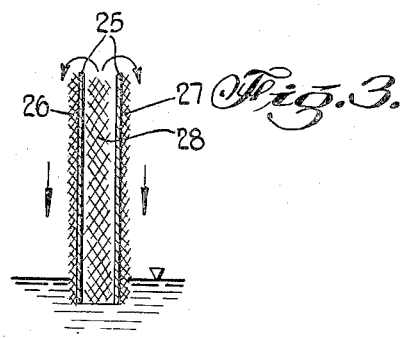
INVENTOR
Peter Köhler
BY
ATTORNEY Patented Nov. 6, 1934

1,979,482

UNITED STATES PATENT OFFICE 1,979,482

ABSORPTION REFRIGERATING APPARATUS

Peter Köhler, Stockholm, Sweden, assignor, by mesne assignments, to Electrolux Servel Corporation, New York, N. Y., a corporation of Delaware Application March 12, 1931, Serial No. 521,989 In Germany October 25, 1930

12 Claims. (Cl. 62—119.5)

This invention relates to absorption refrigerating apparatus and more specifically to an analyzer for use with such apparatus.

In an analyzer refrigerant vapor expelled from solution in the generator and which may contain some absorption liquid vapor is brought into contact with enriched absorption liquid from the absorber. In the analyzer the tendency is for the gas and liquid to reach a state of equilibrium, that is, there will be a heat exchange between the gas and the liquid vaporizing a portion of the refrigerant from the liquid into the gas and condensing the absorption liquid vapor out of the gas until a state of equilibrium is reached depending upon the boiling point of the liquid.

Among the objects of this invention is to provide an analyzer having improved means for effecting contact between the gas and liquid.

Further objects and advantages will be apparent from the following description taken in connection with the accompanying drawing, wherein;

Figure 1 shows schematically in vertical section an analyzer constructed in accordance with this invention and its connections to the generator and absorber of an absorption refrigerating system of the well known pressure equalized type;

Figure 2 is a section of the analyzer taken on line 2—2 of Figure 1; and

Figure 3, a section of one form of wick arrangement which may be used in the analyzer shown in Figures 1 and 2.

Referring to Figure 1 of the drawing a generator 10 containing a solution of refrigerant in an absorption liquid and an absorber 11 are shown as the usual parts in an absorption refrigerating apparatus in which the pressures are equalized by an inert gas circulating between the evaporator and absorber. The circulation of absorption liquid between the generator and absorber is due to the greater liquid level in the generator caused by the bubbles of refrigerant vapor expelled from solution by heat. The level in the generator may also be raised to a higher point by means of any suitable vapor liquid pump as well known in the art, or the absorption liquid may be caused to circulate by mechanical pumping as is also well known in the art.

The absorption liquid from the higher level in the generator flows through a pipe 13, heat exchanger 14, and pipe 15 to the absorber 11. Vaporized refrigerant from the cooling circuit enters the absorber through conduit 16 and is absorbed into the weak absorption liquid entering through the conduit 15 and enriched absorption liquid collects in the bottom of the absorber from where it returns to the generator by gravity through conduit 17, heat exchanger 14, conduit 18, analyzer 19, and conduit 20. The analyzer 19 is positioned so that enriched absorption liquid will be at a level therein substantially the same as the liquid level in the absorber. In small refrigerating apparatus of this type the analyzer according to this invention may be used as a storage vessel for the absorption liquid.

Refrigerant vapor expelled from solution in the generator passes to the analyzer 19 through conduit 21, and leaves the analyzer through conduit 22 to circulate through the usual cooling circuit comprising a condenser and evaporator, not shown. In accordance with this invention a wick-like partition 23 which may be constructed of wire gauze or any other suitable material, is given a spiral form and positioned within the analyzer to define a spiral path between the refrigerant vapor inlet from conduit 21 and the vapor outlet to conduit 22. The lower edge of this wick-like spiral partition extends below the normal liquid level in the analyzer which is substantially the same as the liquid level in the absorber.

Due to the capillary attraction of the partition 23 the enriched absorption liquid from the bottom of the analyzer flows upwardly in the partition keeping the latter thoroughly saturated. The refrigerant vapor from the generator entering the analyzer through conduit 21 follows the spiral path formed by the partition to the outlet conduit 22 and comes in contact with the strong solution in the partition. As set forth above, due to the heat exchange between the gas and the liquid, absorption liquid vapor will be condensed out of the gas and refrigerant vapor will be expelled from the enriched absorption liquid until a state of equilibrium is reached depending upon the boiling point of the absorption liquid in the analyzer. The solution in the wick-like partition 23 becomes weaker in refrigerant due to this action and therefore denser than the surface layer of the solution standing in the bottom of the analyzer and circulation of the liquid results in partition 23 as the liquid enriched with refrigerant tends to rise due to the capillary attraction while the heavier solution continuously being formed in the wick tends to descend. The liquid surface in contact with the gas is thus automatically replaced.

If a greater circulation of liquid in the wick-like partition 23 is desired the latter may be formed as shown in Figure 3, of two spaced parallel plates 25 provided with layers of wire gauze on their outside walls 26 and 27 and on their inside walls 28. The layer between the inside surfaces 28 need not touch the plates 25 if it is desired to prevent heat transfer to the layers on the outside surfaces 26 and 27. The gas circulating through the spiral passage formed by the partition is in contact with the outside walls 26 and 27 of the plates but the liquid in the layer in the space between the plates 25 is not directly exposed to the gas and therefore due to the tendency towards equalization, as previously set forth, between the gas and the liquid in the outside layers, the circulation of the solution will be downward in the outside layers and upward in the center layer. The use of this partition construction is not a necessity since the corresponding circulation will take place provided that the cross section of a single wick-like partition is made sufficiently large.

It will be obvious to those skilled in the art that various other changes may be made in the construction and arrangement without departing from the spirit of the invention and therefore the invention is not limited to what is shown in the drawing and described in the specification but only as indicated in the appended claims.

I claim:

1. In refrigerating apparatus of the absorption type, an analyzer comprising a casing enclosing a fluid tight chamber, a vapor inlet to said chamber, a vapor outlet from said chamber, means defining a fluid path between said inlet and outlet, and means for raising enriched absorption liquid to the surfaces of the first said means by capillary attraction.

2. In refrigerating apparatus of the absorption type, an analyzer comprising a casing enclosing a fluid tight chamber, a gas inlet connection to said chamber, a gas outlet connection from said chamber, a partition of wick-like material defining a spiral passage in said chamber between said inlet and outlet connections, and liquid inlet and outlet connections to said chamber.

3. In refrigerating apparatus of the absorption type, an analyzer comprising a vertical cylindrical casing closed at each end and forming a fluid tight chamber, a vapor inlet to one side of said chamber, a vapor outlet from the top center of said chamber, a wick-like partition forming a spiral fluid passage between said inlet and outlet connections, a portion of said partition extending into the bottom of said chamber, and liquid inlet and outlet connections to the bottom of said chamber.

4. In refrigerating apparatus of the absorption type, raising enriched absorption liquid from the absorber by capillary attraction to a surface contacted by vapor from the generator.

5. In absorption refrigerating systems of the pressure equalized type having a generator and absorber interconnected for the circulation of absorption liquid therethrough, an analyzer comprising a closed vessel connected in the system to contain in the lower part thereof enriched absorption liquid flowing from the absorber to the generator, a wick-like member in the upper part of said vessel extending downwardly into the liquid, and connections for the circulation of gas from the generator through the upper part of said vessel.

6. In absorption refrigerating systems of the pressure equalized type having a generator and absorber interconnected for the circulation of absorption liquid therethrough, an analyzer comprising a closed vessel connected in the system to contain in the lower part thereof enriched absorption liquid flowing from the absorber to the generator, inlet and outlet connections to the upper part of said vessel for the circulation therethrough of gas from the generator, and partition means of wick-like material defining a fluid path between said inlet and outlet connections and extending into the liquid in the bottom of said vessel.

7. Refrigerating apparatus of the absorption type including a generator, an absorber, means for circulating absorption liquid between said generator and absorber, and an analyzer comprising a closed vessel connected to contain in the lower part thereof enriched absorption liquid flowing from the absorber to the generator, inlet and outlet connections for the circulation of gas from the generator through the upper part of said vessel, and wick-like means forming a spiral fluid passage between said inlet and outlet connections and extending into the liquid in the bottom of said vessel.

8. In refrigerating systems of the absorption type, flowing enriched absorption liquid at a first level, flowing vapor at a higher level, and raising enriched absorption liquid by capillary attraction into the path of flow of vapor.

9. In refrigerating systems of the absorption type an analyzer including a wick-like member having its upper portion in the path of flow of vapor from the generator and its lower portion supplied with enriched absorption liquid from the absorber.

10. In refrigerating systems of the absorption type, a generator, an absorber, and capillary means for raising enriched absorption liquid from the absorber into contact with vapor from the generator.

11. In refrigeration systems of the absorption type, maintaining a wick-like member above a body of enriched absorption liquid with its lower portion in contact therewith, and conducting refrigerant vapor expelled from solution in the generator in contact with said member.

12. In a refrigerating apparatus, an absorber, a generator, means to conduct liquid from the absorber to the generator in a path having a predetermined maximum natural level, means to elevate liquid above said level by capillary attraction, and means to conduct vapor from the generator into direct contact with the liquid so elevated.

PETER KÖHLER.